US007641749B2

(12) United States Patent
Giacomazzi et al.

(10) Patent No.: US 7,641,749 B2
(45) Date of Patent: Jan. 5, 2010

(54) METHOD AND MACHINE FOR LABELLING A SUCCESSION OF CONTAINERS BY MEANS OF A NUMBER OF INDEPENDENT LABELLING STATIONS

(75) Inventors: Gianluca Giacomazzi, Goito (IT); Stefano Cavallari, Bologna (IT)

(73) Assignee: Azionaria Costruzioni Macchine Automatiche A.C.M.A. S.p.A. (IT)

( * ) Notice: Subject to any disclaimer, the term of this patent is extended or adjusted under 35 U.S.C. 154(b) by 832 days.

(21) Appl. No.: 10/525,924

(22) PCT Filed: Aug. 20, 2003

(86) PCT No.: PCT/EP03/50382

§ 371 (c)(1), (2), (4) Date: Oct. 25, 2005

(87) PCT Pub. No.: WO2004/020292

PCT Pub. Date: Mar. 11, 2004

(65) Prior Publication Data

US 2006/0113020 A1 Jun. 1, 2006

(30) Foreign Application Priority Data

Aug. 29, 2002 (IT) .......................... BO2002A0550

(51) Int. Cl.
*B32B 41/00* (2006.01)

(52) U.S. Cl. ......................... 156/64; 156/360; 156/362; 156/363; 156/366; 156/367; 156/378; 156/379

(58) Field of Classification Search .................. 156/64, 156/187, 360, 362, 363, 366, 367, 378, 379, 156/DIG. 44, DIG. 46
See application file for complete search history.

(56) References Cited

U.S. PATENT DOCUMENTS

| | | | | |
|---|---|---|---|---|
| 4,279,687 | A | 7/1981 | Buchholz et al. | |
| 5,342,461 | A | 8/1994 | Murphy | |
| 5,529,191 | A * | 6/1996 | Washeim | 209/523 |
| 6,220,330 | B1 | 4/2001 | O'Brien, Jr. | |
| 6,419,782 | B1 | 7/2002 | Johnson et al. | |

(Continued)

FOREIGN PATENT DOCUMENTS

DE 201 15 480 5/2002

(Continued)

OTHER PUBLICATIONS

Office Action issued by the Russian Patent Office on Mar. 14, 2007 in connection with Russian Application No. 2005018666/11 corresponding to PCT/EP2003/50382.

(Continued)

*Primary Examiner*—George R Koch, III
(74) *Attorney, Agent, or Firm*—Ostrolenk Faber LLP

(57) ABSTRACT

A method and machine for labelling a succession of containers, whereby each container is identified to assign to the container one of a number of possible types, and the container is then fed along a labelling path through a number of labelling stations, each of which applies respective labels to containers falling within a respective category, and is activated to apply the label to the container if the container falls within the respective category.

13 Claims, 2 Drawing Sheets

U.S. PATENT DOCUMENTS

| | | | | |
|---|---|---|---|---|
| 6,428,639 | B1 * | 8/2002 | Oldenburg et al. | 156/64 |
| 2005/0045263 | A1 | 3/2005 | Heuft et al. | 156/64 |

FOREIGN PATENT DOCUMENTS

| | | |
|---|---|---|
| EP | 1 097 871 | 5/2001 |
| SU | 882406 | 11/1981 |

OTHER PUBLICATIONS

Translation of the Office Action issued by the Russian Patent Office on Mar. 14, 2007 in connection with Russian Application No. 2005018666/11 corresponding to PCT/EP2003/50382.

International Search Report of PCT/EP03/50382 dated Dec. 17, 2003.

* cited by examiner

METHOD AND MACHINE FOR LABELLING A SUCCESSION OF CONTAINERS BY MEANS OF A NUMBER OF INDEPENDENT LABELLING STATIONS

CROSS REFERENCE TO RELATED APPLICATION

The present application is a 35 U.S.C. §371 national phase conversion of PCT/EP2003/050382 filed 20 Aug. 2003, which claims priority of Italian Application No. BO2002A000550

TECHNICAL FIELD

The present invention relates to a method of labelling a succession of containers.

The present invention may be used to particular advantage for labelling a succession of bottles in a bottling plant, to which the following description refers purely by way of example.

A bottling plant comprises a number of bottling lines, each comprising a succession of machines arranged in series. More specifically, each bottling line may comprise a filling machine for receiving empty bottles from a store and filling each with a predetermined amount of a liquid product; a capping machine for applying a cap to each bottle; a labelling machine for applying one or more labels to each bottle; and, possibly, a packing machine for packing a group of bottles to form a respective package.

BACKGROUND ART

Known labelling machines, such as the type described in DE19927668, DE3925842, U.S. Pat. No. 5,478,422A1, U.S. Pat. No. 5,259,913A1 or EP1167213A1, comprise a vertical-axis carousel conveyor for feeding the bottles along an annular path through at least one labelling station, where a label is applied to each bottle. Known labelling machines may comprise either one labelling station, or two (or more) for applying, for example, a front and rear label to each bottle.

Known bottling plants of the above type are relatively bulky and expensive by requiring an independent bottling line for each type of liquid product. Alternatively, the same bottling line may be used for different liquid products, but only at the expense of frequent type changes (i.e. to adapt the bottling line to a different liquid product), thus obviously reducing overall output.

DISCLOSURE OF INVENTION

It is an object of the present invention to provide a method of labelling a succession of containers, designed to eliminate the aforementioned drawbacks, and which, in particular, is cheap and easy to implement.

According to the present invention, there is provided a method of labelling a succession of containers, whereby each container is fed along a labelling path through a number of labelling stations, each for applying a respective label to a container travelling through the labelling station; the method being characterized by assigning a category of containers to each labelling station; identifying each container to assign to the container one of a number of possible types before the container is fed along the labelling path; and only activating each labelling station to apply the label to the container travelling through the labelling station if the container falls within the category of containers assigned to the labelling station.

The present invention also relates to a machine for labelling a succession of containers.

According to the present invention, there is provided a machine for labelling a succession of containers, the machine comprising a conveyor for feeding each container along a labelling path; and a number of labelling stations, each located along the labelling path and for applying a respective label to a container travelling through the labelling station; the machine being characterized by comprising a recognition device for identifying each container and assigning to the container one of a number of possible types before the container is fed along the labelling path; each labelling station comprising respective control means for memorizing a category of containers assigned to the labelling station, and which only activate the respective labelling station to apply the label to the container travelling through the labelling station if the container falls within the category of containers assigned to the labelling station.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
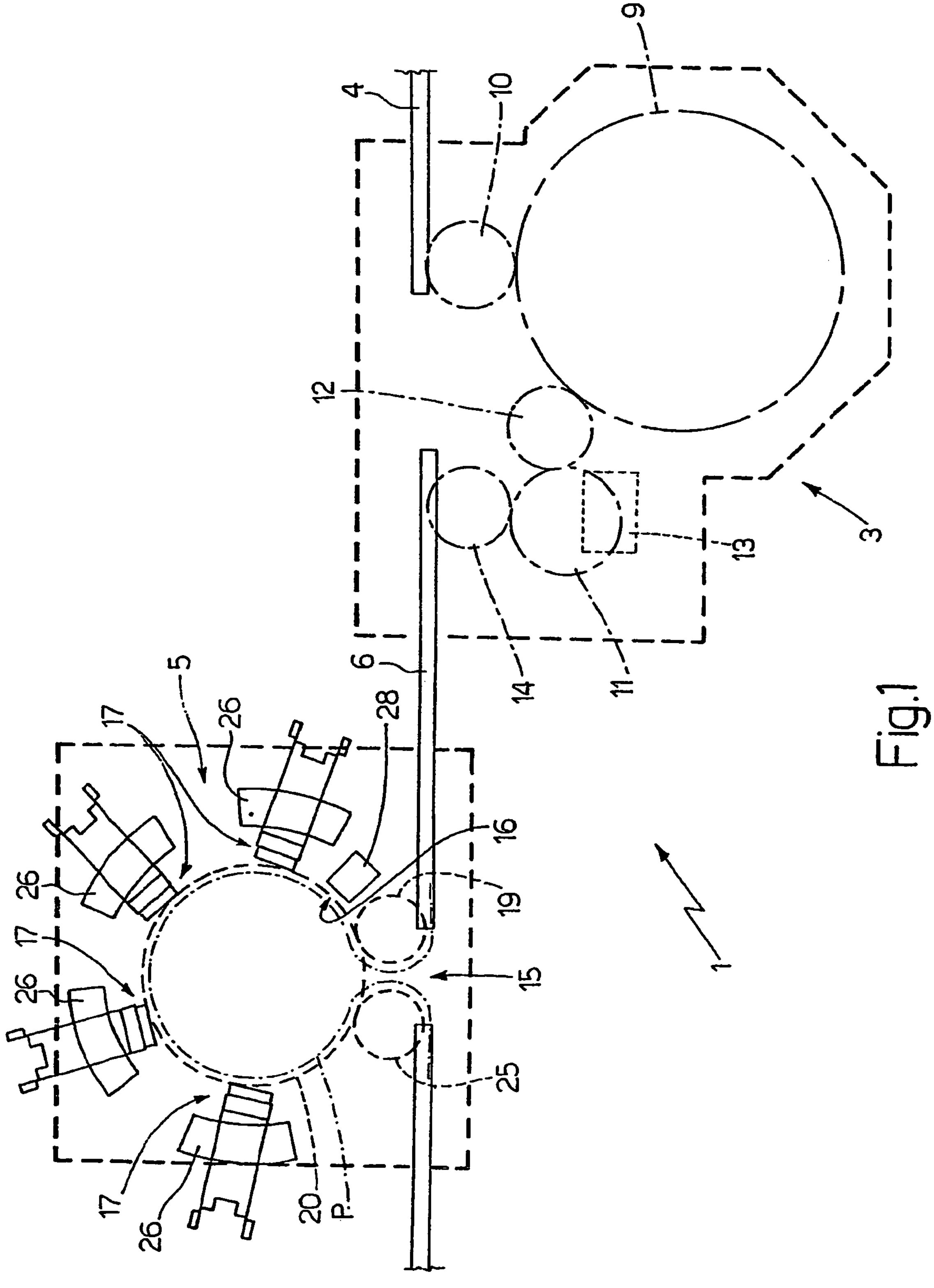
FIG. 1 shows a schematic plan view, with parts removed for clarity, of part of a bottling plant featuring the labelling machine according to the present invention.
Figure 2:
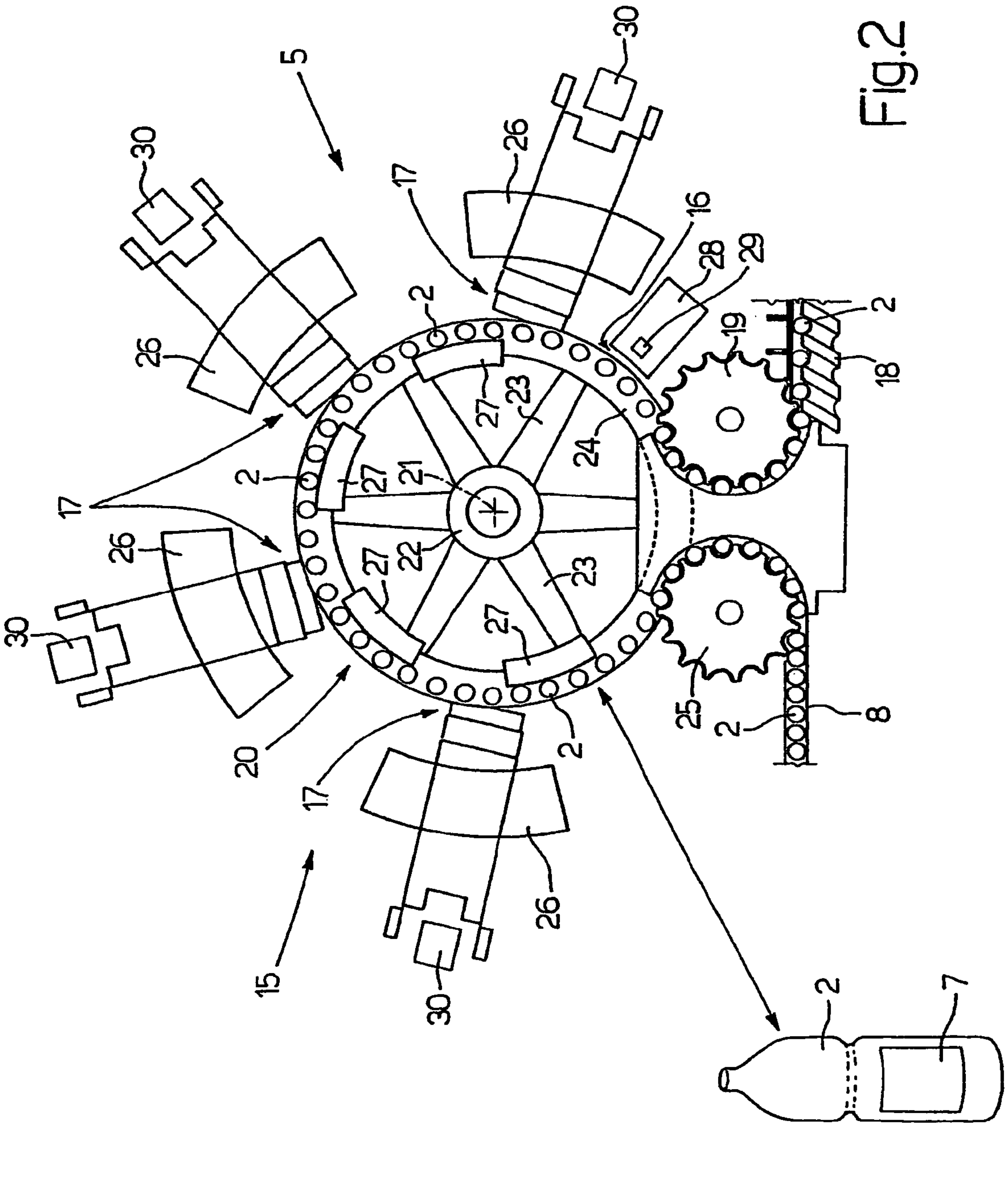
FIG. 2 shows a larger-scale plan view of the FIG. 1 labelling machine.

Number 1 in FIGS. 1 and 2 indicates as a whole a bottling line for filling bottles 2. Bottling line 1 comprises a known filling machine 3 for receiving empty bottles 2 from an input conveyor 4, and feeding full bottles 2 to a labelling machine 5 by means of an intermediate conveyor 6. On labelling machine 5, a label 7 is applied to each bottle 2, and bottles 2 are then fed onto an output conveyor 8, which feeds bottles 2 to a known packing machine (not shown).

Filling machine 3 is a so-called multiple type for filling bottles 2 with four types of liquid of different colours, and comprises a vertical-axis carousel conveyor 9 for receiving empty bottles 2 from input conveyor 4 by means of a transfer drum 10, and for feeding full bottles 2 to a vertical-axis carousel conveyor 11 by means of a transfer drum 12. Carousel conveyor 11 is connected to a known capping station 13 where a cap (not shown) is applied to each bottle 2, and the full, capped bottles 2 are fed by carousel conveyor 11 to intermediate conveyor 6 by means of a transfer drum 14.

Labelling machine 5 comprises a conveyor 15 for feeding a succession of bottles 2 along a labelling path P, which extends from the output of intermediate conveyor 6 to the input of output conveyor 8 via a recognition station 16 and four labelling stations 17.

As shown in FIG. 2, conveyor 15 comprises a screw 18 located at the output of intermediate conveyor 6 and for equally spacing bottles 2 supplied by intermediate conveyor 6; and a transfer drum 19 is located at the end of screw 18 to feed bottles 2 to a carousel conveyor 20 having a vertical axis 21, and along the periphery of which are located recognition station 16 and the four labelling stations 17. More specifically, carousel conveyor 20 comprises a central hub 22, from which radiate a number of spokes 23 supporting a circular rim 24 for feeding bottles 2 along labelling path P; and carousel conveyor 20 is connected to a transfer drum 25 for extracting bottles 2 from carousel conveyor 20 and feeding bottles 2 to output conveyor 8.

Each labelling station 17 comprises a known labelling device 26, e.g. of the type described in Patent Application EP1122175A1 (in general, each labelling device 26 provides for applying any type of label 7, e.g. hot-glued, cold-glued, or self-adhesive); and each labelling device 26 withdraws a label 7 from a respective known store (not shown in detail) and applies label 7 to a bottle 2 travelling past labelling device 26. A known fixed pad 27 downstream from each labelling device 26 performs a rolling operation on each bottle 2 to ensure firm adhesion of label 7 applied to bottle 2 by labelling device 26.

In an embodiment not shown, each labelling device 26 is mounted on a carriage slidable along a guide, and is movable along the guide by an actuating device to adapt its position with respect to carousel conveyor 20 as a function of the shape and size of bottles 2.

Recognition station 16 comprises a recognition device 28 in turn comprising an optical sensor 29 for identifying, and assigning one of four possible types to, each bottle 2 travelling through recognition station 16. Sensor 29 typically identifies each bottle 2 according to its colour (as produced by the colour of the liquid inside bottle 2, and also by the colour of bottle 2 itself). Alternatively, sensor 29 may identify each bottle 2 according to its shape and/or size.

In an alternative embodiment not shown, as opposed to recognition device 28, recognition station 16 comprises a communication device for identifying each bottle 2 by processing information from machines upstream from labelling machine 5, and in particular from filling machine 3.

Each labelling station 17 comprises a control unit 30 connected to recognition device 28, and which memorizes a category of bottles 2 so as to only activate labelling station 17 to apply label 7 to the bottle 2 travelling through labelling station 17 if bottle 2 falls within the category of bottles 2 assigned to labelling station 17. The category of bottles 2 memorized in each control unit 30 and assigned to respective labelling station 17 is normally defined by a variable number of bottle types equal to or greater than zero. Obviously, if the number equals zero, the labelling station 17 is never activated.

In actual use, labelling machine 5 is supplied by filling machine 3 with a succession of bottles 2 of four different types. As each bottle 2 travels through recognition station 16, recognition device 28 identifies and communicates the type of bottle 2 to control units 30 of labelling stations 17; and, as each bottle 2 travels through a labelling station 17, the labelling station 17 is only activated by respective control unit 30 to apply the corresponding label 7 to bottle 2 if the type of bottle 2 falls within the category memorized in respective control unit 30, i.e. only if the type of bottle 2 falls within the category of bottles 2 assigned to the labelling station 17.

Each labelling station 17 may obviously apply labels to bottles 2 of one or more types, and the number of types of bottles 2 supplied to labelling machine 5 may obviously be other (more or less) than four.

In another embodiment, each labelling station 17 can adjust the position in which respective label 7 is applied to corresponding bottle 2 as a function of the type of bottle 2.

Labelling machine 5 as described above therefore provides for applying labels 7 to different types of bottles 2, and can therefore be connected to a multiple filling machine 3 or to a number of single filling machines 3, thus reducing the overall size and cost of the bottling plant.

Moreover, labelling machine 5 provides for applying labels 7 to different types of bottles 2 with no type change required, and is therefore suitable for use on bottling lines involving frequent changes in the type of bottles produced.

The invention claimed is:

1. A method of labelling a succession of containers; the method comprising the following steps:

identifying each container to assign to each container one of a number of possible types before each container is fed along a labelling path (P), each container being identified on the basis of at least one of colour, shape and size of the container or by processing information from operating machines located upstream from the labelling path (P);

assigning each container with one of the possible types;

feeding each container along the labelling path (P) through a number of labelling stations, each of the labelling stations being configured for applying a respective label to a container travelling through a respective labelling station;

loading the labelling stations with different types of pre-printed labels and assigning to each type of pre-printed labels a category of containers different from the categories of containers of the other types of pre-printed labels so that each type of pre-printed labels loaded in a relevant labelling station is assigned to only a limited number of related containers; and only activating each labelling station to apply a type of pre-printed label to the container travelling through the labelling station if such container is of a type which falls within the category of containers assigned to the type of pre-printed labels loaded in the labelling station; so that each labelling station applies its own pre-printed labels to all and only the limited number of containers falling within the category of containers assigned to the pre-printed labels in the respective labelling station.

2. A method as claimed in claim 1, wherein each container is identified by feeding the container through a recognition station located upstream from the labelling stations along the labelling path (P) and having at least one sensor for identifying the container.

3. A method as claimed in claim 1, wherein each container is identified on the basis of the shape of the container.

4. A method as claimed in claim 1, wherein each container is identified on the basis of the size of the container.

5. A method as claimed in claim 1, wherein each container is identified on the basis of the colour of the container.

6. A method as claimed in claim 1, wherein each labelling station comprises a respective guide; and a respective labelling device, which is moved along the guide to adapt its position as a function of the shape and size of the containers with respect to a conveyor for feeding each container along the labelling path (P).

7. A machine for labelling a succession of containers; the machine comprising:

a conveyor for feeding each container along a labelling path (P), a number of labelling stations, each loaded with a number of same type of pre-printed labels and located along the labelling path (P) configured for applying a respective label to a container travelling through a respective labelling station, and a recognition device configured for identifying each container and assigning to each container one of a number of possible types before each container is fed along the labelling path (P), each container being identified and assigned on the basis of at least one of colour, shape and size of the container or by processing information from operating machines located upstream from the labelling path;

wherein each labelling station comprises respective control means for memorizing a category of containers assigned to a respective type of pre-printed labels loaded in the respective labelling stations which category is different from categories of containers assigned to other types of pre-printed labels loaded in other respective labelling stations so that each type of pre-printed labels loaded in a respective labelling station is assigned only to a limited number of containers; and wherein the control means of each labelling station only activate the respective labelling station to apply the respective pre-printed label to the container travelling through the labelling station if such container falls within the category of containers assigned to the type of pre-printed labels loaded in the labelling station so that each labelling station applies its own pre-printed labels to all and only the limited number of container falling within the category of containers assigned to the pre-printed labels.

8. A machine as claimed in claim 7, wherein the recognition device comprises a recognition station located upstream from the labelling stations along the labelling path (P) and having at least one sensor for identifying the container.

9. A machine as claimed in claim 8, wherein the sensor identifies each container on the basis of the shape of the container.

10. A machine as claimed in claim 8, wherein the sensor identifies each container on the basis of the size of the container.

11. A machine as claimed in claim 8, wherein the sensor identifies each container on the basis of the colour of the container.

12. A machine as claimed in claim 7, wherein the conveyor comprises a carousel conveyor with a vertical axis.

13. A machine as claimed in claim 7, wherein each labelling station comprises a respective guide; and a respective labelling device, which is mounted to move along the guide to adapt its position with respect to the conveyor as a function of the shape and size of the containers.

* * * * *